United States Patent [19]
Kent

[11] 3,757,533
[45] Sept. 11, 1973

[54] CRYOGENIC FREEZER UNIT
[76] Inventor: James T. Kent, 730 Post Oak, Houston, Tex. 77024
[22] Filed: Feb. 14, 1972
[21] Appl. No.: 225,949

[52] U.S. Cl. ........................ 62/303, 62/374, 62/380
[51] Int. Cl. ........................................... F28g 15/08
[58] Field of Search ..................... 62/303, 374, 375, 62/380

[56] References Cited
UNITED STATES PATENTS

| | | | |
|---|---|---|---|
| 3,583,171 | 6/1971 | Flynn et al. | 62/303 X |
| 3,611,737 | 10/1971 | Alaburda et al. | 62/374 X |
| 2,787,141 | 4/1957 | Julius | 62/374 X |
| 3,486,345 | 12/1969 | Waldin | 62/375 X |
| 3,048,987 | 8/1962 | Wentworth | 62/374 X |
| 3,494,140 | 2/1970 | Harper et al. | 62/303 X |
| 3,601,901 | 8/1971 | Rader | 62/303 X |

Primary Examiner—Meyer Perlin
Assistant Examiner—Ronald C. Capossela
Attorney—Pravel, Wilson & Matthews

[57] ABSTRACT

A tunnel-type cryogenic freezing unit for freezing articles such as food which includes first and second housing sections which form a tunnel through which a conveyor moves the food, exposing means to move the second housing section away from the first housing section to expose the inside of the unit for ease in cleaning or otherwise maintaining the unit, and a accumulator means to collect any unused sprayed cryogenic liquid so that the food is again subjected to the freezing action of the liquid.

12 Claims, 7 Drawing Figures

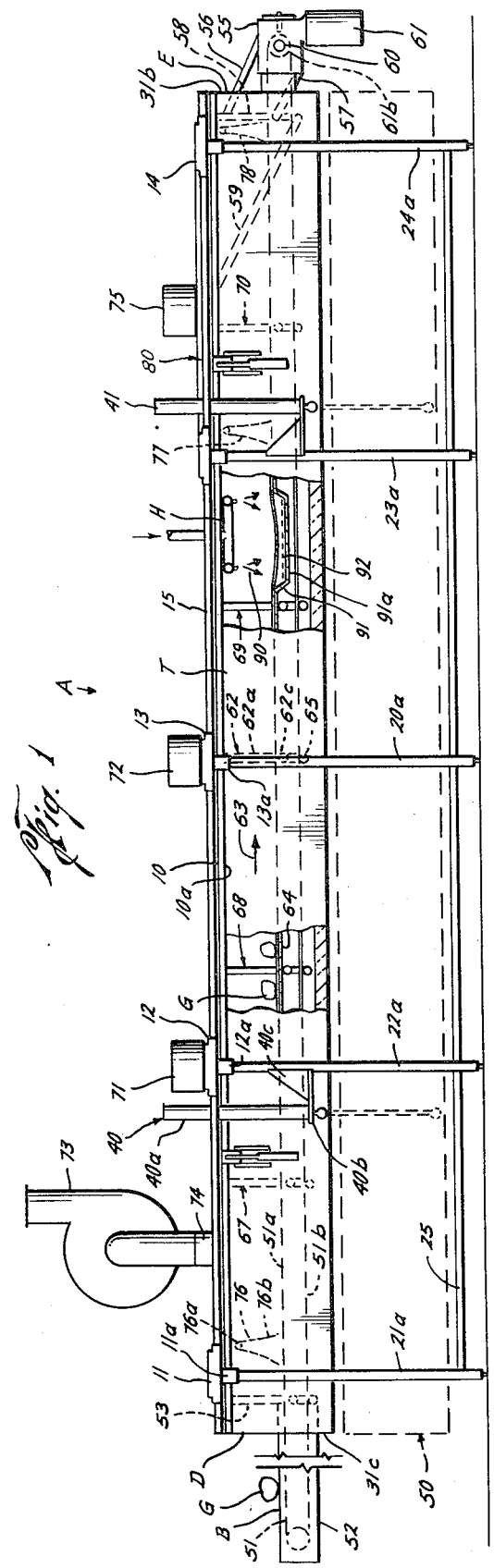
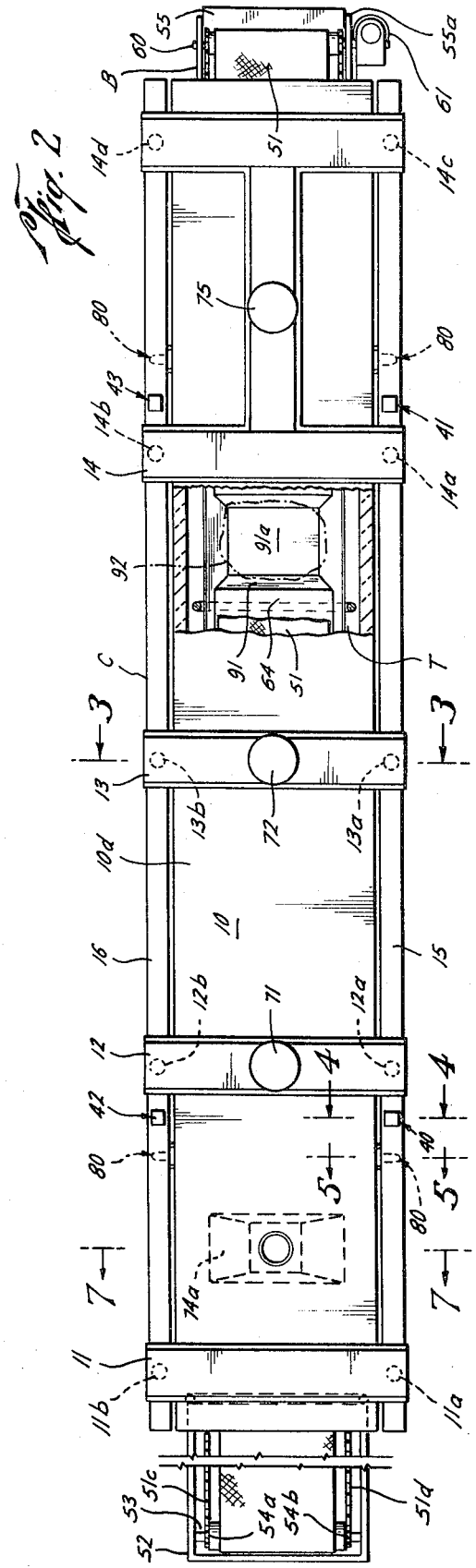

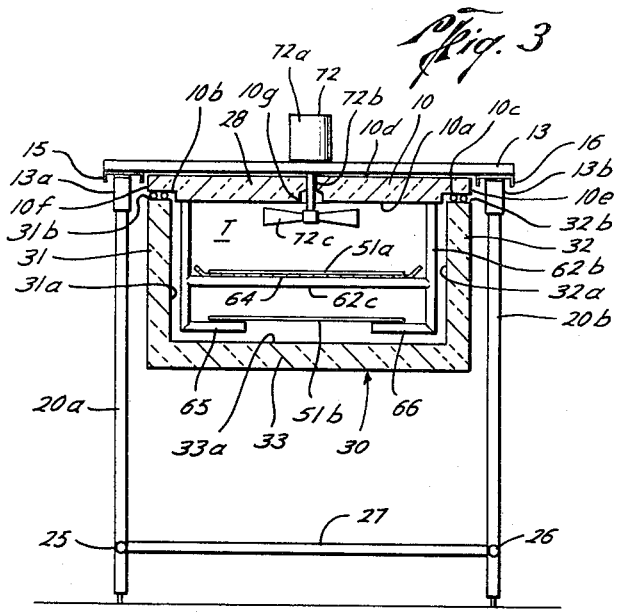
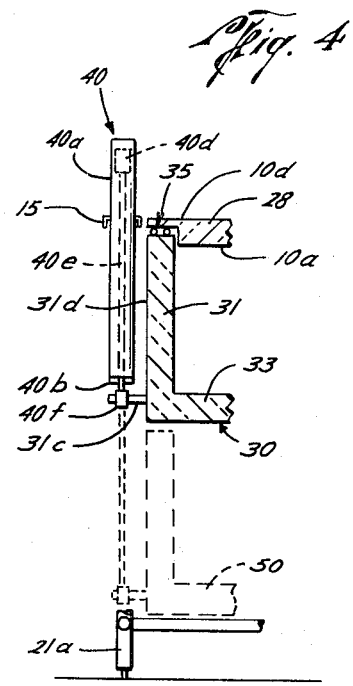
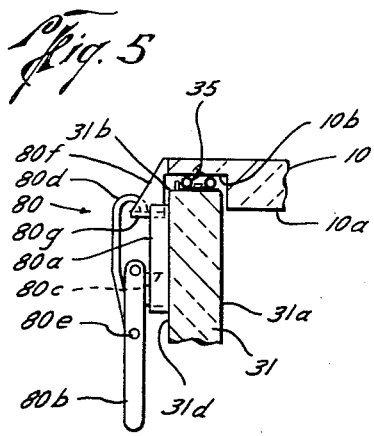
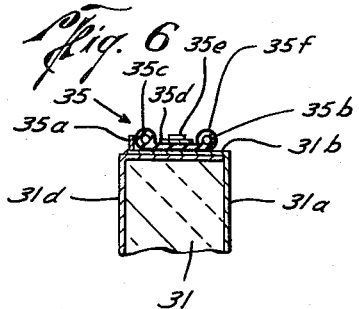
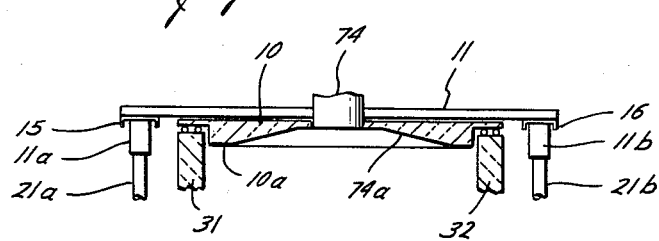

3,757,533

CRYOGENIC FREEZER UNIT

BACKGROUND OF THE INVENTION

1. Field of the Invention

The field of this invention is apparatus for cryogenically freezing articles such as food.

2. Description of the Prior Art

Food is frozen very quickly upon exposure to cryogenic liquid such as liquid nitrogen at "super-cold" temperatures. Cryogenic freezing techniques offer many advantages over conventional freezing techniques. For example, such quick freezing of food preserves the moisture content of the food and thus eliminates dehydration. Further, quick freezing prevents "freezer burn" and maintains the original appearance and color of the food.

In the prior art, freezer units such as the unit disclosed in U.S. Pat. No. 3,455,120, issued to Schlemmer, comprised a housing which formed a tunnel through which food articles were moved on a conveyor. In the Schlemmer patent, the food was exposed to a cryogenic liquid sprayed in the tunnel during movement of the food on the conveyor through the housing.

One of the problems encountered in using a cryogenic freezing unit such as disclosed in the Schlemmer patent is the difficulty of maintaining the freezer unit in an extremely sanitary condition. During use, food particles or chips drop on the conveyor, the conveyor pan and in the housing; periodically, these food chips must be removed from the housing. Various attempts have been made to make the inside of the housing of cryogenic freezer units more accessible for ease in cleaning. For example, in the Schlemmer patent, the top panel of the housing is removable; however, such an arrangement does not expose the bottom of the housing sufficiently to allow it to be cleaned easily and thoroughly.

Another problem encountered in freezing by the application of cryogenic liquid is distribution of the liquid over the food as the food is moved through the conveyor. The greatest heat absorption occurs upon contact of the cryogenic liquid with the food. In existing cryogenic freezing units, insofar as known, any sprayed liquid which does not contact the food is left to evaporate without further contact with the food. The inability of such units to fully utilize the heat absorption potential of all of the sprayed cryogenic liquid results in a loss of efficiency.

An additional difficulty with such cryogenic freezer units is maintaining an effective seal between housing sections throughout the length of the tunnel in spite of buckling of the walls of the housing due to the tremendous differences in temperature between the inside and outside of the housing.

SUMMARY OF THE INVENTION

The present invention relates to a cryogenic freezer unit which overcomes the prior art difficulties in cleaning and otherwise maintaining the cryogenic freezer unit clean, by providing a housing which includes a first housing section in sealed engagement with a second U-shaped housing section to provide a tunnel. A conveyor belt assembly is suspended from the first housing section and a spray header directs a cryogenic liquid on food or other articles moving through the tunnel on the conveyor. Exposing means moves the second U-shaped housing section away from the first housing section to provide access to the inside of the housing so that the housing can be easily cleaned.

In another aspect of this invention, a pan is positioned below the upper reach of the conveyor belt and has a recessed portion below the spray header to receive any of the sprayed cryogenic liquid that is not vaporized when sprayed in proximity to the food moving on the conveyor belt. Such cryogenic liquid accumulates in the recessed portion of the pan and forms a puddle or pool. The conveyor belt is flexible so that it sags into the pool of cryogenic liquid in the recessed portion of the pan such that articles on the conveyor belt are subjected to cryogenic liquid both from the spray header and the recessed portion of the pan.

BRIEF DESCRIPTION OF THE DRAWINGS

The preferred embodiment of this invention will be described hereinafter, together with other features thereof, and additional objects will become evident from such description.

The invention will be more readily understood from a reading of the following specification and by references to the accompanying drawings froming a part thereof wherein an example of the invention is shown and wherein:

FIG. 1 is an elevational view of the cryogenic freezing unit of the preferred embodiment of this invention wherein certain portions of the housing are removed to illustrate features of this invention;

FIG. 2 is a top view of the cryogenic freezing unit with a portion of the top housing section removed to illustrate features of this invention;

FIG. 3 is a sectional view taken along line 3—3 of FIG. 2 further illustrating the suspension of the flexible conveyor belt of the conveyor means of this invention;

FIG. 4 is a sectional view taken along line 4—4 of FIG. 2 illustrating the means for exposing the inside of the housing for cleaning or other purposes;

FIG. 5 is a sectional view taken along line 5—5 of FIG. 2 illustrating the releasable clamp means for clamping the top and bottom housing sections together in a sealed relationship;

FIG. 6 is an enlarged view of a portion of FIG. 5 illustrating the details of the double sealing gasket of this invention; and FIG. 7 is a view taken along line 7—7 of FIG. 2 illustrating the configuration of the bottom wall of the top housing section at the blower vent.

DESCRIPTION OF THE PREFERRED EMBODIMENT

Referring to the drawings, the letter A generally designates a cryogenic freezing unit of the preferred embodiment of this invention. The cryogenic freezing unit includes a spray header H for spraying a cryogenic liquid and a conveyor means B, which are mounted within a tunnel T, to freeze articles such as food or the like as such articles are conveyed from the entrance D of the cryogenic freezing unit A to the exit E.

The cryogenic freezing unit A includes a top housing section 10 having a bottom wall 10a. The bottom wall 10a has an offset 10b at one side and an offset 10c at the other side. The top housing section 10 further includes a top wall 10d. A plurality of cross braces 11, 12 and 13 and an H-shaped brace 14 are mounted onto the top wall by welding or other suitable means. Each of the cross braces 11, 12 and 13 as well as the H-shaped brace 14 extend outwardly from side walls 10e and 10f of the top housing section 10. The cross braces 11, 12 and 13 and the H-shaped brace 14 are welded or otherwise suitably attached to beams 15 and 16 which extend longitudinally of the top housing section 10. Sockets 13a and 13b are welded or otherwise attached to the beams 15 and 16 at the cross brace 13 such that the sockets extend downwardly therefrom. A leg 20a extends into the socket 13a and a leg 20b extends into the socket 13b. The cross braces 11, 12 and the H-shaped brace 14 also include identically mounted socket members 11a, 11b and 12a, 12b, respectively, (FIGS. 1 and 2) which extend downwardly from the beams 15 and 16 at the braces. Support legs 21a and 21b are mounted in the sockets 11a and 11b respectively and in a similar manner, the legs 22a, 22b are mounted in the sockets 12a, 12b, respectively. The H-shaped brace 14 is supported by four legs 23a and 24a in sockets 14a, 14b, 14c, 14d (FIG. 2), although only one of each pair of legs 23a, 24a is illustrated in the drawings. It will be understood that another leg is mounted in each of the sockets which extend downwardly from the beam 16 at the cross brace 12 and the H-shaped beam 14.

The vertically extending legs 21a, 22a, 20a, 23a and 24a are connected by a longitudinally extending rod 25 which preferably extends through holes (not shown) in each of the legs 21a, 22a, 20a, 23a and 24a to provide support for such legs. In a similar manner, another rod 26 extends through each of the legs such as 20b and 21b on the other side of the top housing section 10. In order to provide further support for the legs such as 20a and 20b, cross rods such as 27 (FIG. 3) may extend between the legs 20a and 20b and are attached thereto by any suitable means such as welding. Similar cross rods (not shown) extend between each pair of legs which are mounted underneath each of the cross braces 11, 12 and the H-shaped brace 14. In this manner, the top housing section 10 is mounted in a substantially horizontal position.

A bottom U-shaped housing section generally designated as 30 includes side portions 31 and 32 which are connected by means of a bottom portion 33. The inside walls 31a, 33a and 32a of the portions 31, 33 and 32, respectively, cooperate with the bottom wall 10a of the top housing section 10 to provide the tunnel T through the cryogenic freezing unit A with the bottom U-shaped housing section 30 in the normal or operating position illustrated in FIG. 3. The inside walls 31a, 32a and 33a, outside walls such as 31d, upper ends 31b and 32b, and end walls 31e and 31f are stainless steel. These walls may be formed by bending a single sheet of stainless steel and welding the various end portions to such sheet. Polyurethane or other insulating material is placed in the U-shaped housing 30 to thoroughly insulate against heat transfer.

Seal means 35 are mounted on the upper end 31b of the side portion 31 and on upper end 32b of the side portion 32 and extends into sealed engagement with the offset portions 10b and 10c, respectively, of the bottom wall 10a of the top housing section 10 with the U-shaped housing 30 in the normal or operating position. The seal means 35, which will be described in greater detail hereinafter, cooperates with the top housing section 10 and the U-shaped housing section 30 to prevent the passage or transfer of heat between the outside environment and the tunnel T when the U-shaped housing section is in the normal or operating position of FIG. 3.

The seal means 35 mounted on upper ends 31b and 32b of the side portions 31 and 32 are maintained in sealed engagement with the offset portions 10b and 10c of the top housing section by means of a plurality of double-acting hydraulic cylinder assemblies generally designated as 40, 41, 42 and 43. Referring to FIG. 4 the double-acting hydraulic cylinder assembly 40 includes a cylinder 40a which extends through an opening in the beam 15 and is attached to the beam 15 by any suitable means such as welding. The hydraulic cylinder 40 is also attached to the support leg 22a by means of the laterally extending member 40b, which is attached to both the support leg 22a and the bottom portion of the hydraulic cylinder 40a, the laterally extending member 40b being reinforced by a gusset 40c. A piston 40d is mounted for slidable, sealable movement within the cylinder 40a and a rod 40e is connected to the piston 40d for movement therewith. The lower end of the rod 40e includes a sleeve portion 40f which fits over and attaches to the stud 31c extending from the outside wall 31d of the side portion 31 of the U-shaped bottom section 30. The U-shaped bottom housing section 30 is held in the normal or operating position where the seal means 35 engages the offsets 10b and 10c by the application of hydraulic fluid pressure into the cylinder 40a below the piston 40d such that the piston and rod combination are urged upwardly to the position illustrated in the hydraulic cylinder 40a in FIG. 4. The U-shaped housing section 30 is moved downwardly to an exposed position, which is illustrated in broken lines at 50 in FIGS. 1 and 4, by the application of hydraulic fluid into the cylinder 40a above the piston 40d.

The hydraulic cylinder assembly 41 is also positioned with the beam 15 and the hydraulic cylinder assemblies 42 and 43 are positioned with the beam 16 such that the four hydraulic cylinder assemblies 40, 41, 42 and 43 are equally spaced about the top housing section 10 and U-shaped bottom housing section 30 to fully support the U-shaped housing section 30 in both the normal or operating position and the lower or exposed position 50. The hydraulic cylinder assemblies 41, 42 and 43 are identical to assembly 40 except for location and cooperate with assembly 41 to move the bottom U-shaped housing section. The moving of the U-shaped housing section 30 to the exposed position 50 offers the advantage, which will be described in more detail hereinafter, of exposing the inside walls 31a, 33a and 32a of the U-shaped housing portion 30 as well as the bottom wall 10a of the top housing section 10 for ease in cleaning and performing other maintenance operations.

A conveyor assembly B is mounted within the tunnel T formed by the top housing section 10 and U-shaped bottom housing section 30 and is suspended from the top housing section 10 in order to convey the articles such as food or the like throughout the length of the tunnel T. The conveyor assembly means B includes a continuous, flexible belt 51 which may be comprised of a steel mesh having chain drives 51c and 51d attached to the edges thereof so that the conveyor belt 51 may be continually rotated. The conveyor belt 51 is supported at the entrance D of the tunnel T by means of a housing 52 which is attached to vertically extending rods such as 53 which extend downwardly from the bottom wall 10a of the top housing section 10. A shaft 53 is journaled into the housing 52 for rotation with respect thereto and has driving gears 54a and 54b fixedly attached thereto such that the driving gears 54a and 54b engage the chain drives 51c and 51d, respectively, attached to the conveyor belt 51 so that the conveyor belt 51 is maintained in alignment as it is rotated. The conveyor belt 51 is supported at the exit E of the tunnel T and is driven therefrom. A housing 55 is suspended by means of support members 56 and 57, which are attached to a vertically extending support rod 58. The vertically extending support rod 58 extends downwardly from the bottom wall 10a of the top housing section 10 and is supported in a vertical position by means of the brace 59 which is attached to the bottom of the support rod 58 and extends at an incline into attachment with the bottom wall 10a. A similar supporting rod assembly may be mounted onto the other side of the housing 55 in order to provide further support for the housing in the position illustrated at the exit E of the tunnel T. A shaft 60 is journaled into the housing 55 and driving gears such as 61b, which is shown schematically in FIG. 1, are fixedly attached to the shaft 60. A motor 61 is mounted onto a panel 55a of the housing 55 and is drivingly attached to the shaft 60 such that the motor rotates the shaft 60 and drives the driving gears such as 61b in order to engage the continual chain drives 51c and 51d and thus continually rotate the conveyor belt 51 in a clockwise direction. In this manner, articles of food or the like can be deposited on the conveyor belt 51 at the entrance D of the tunnel T and are moved through the tunnel T to the exit E. It is to be understood that the conveyor belt 51 can be make of a number of suitable materials; however, a steel mesh has been found quite suitable for the purposes of conveying food through the tunnel T for providing as much circulation for the cryogenic liquid and vapors as possible.

The conveyor belt 51 can be further supported within the tunnel T by means of the support brace assembly 62 formed by legs such as 62a and 62b which extend downwardly from the bottom wall 10a of the top housing section 10. A cross rod 62c is attached to both legs 62a and 62b and support the upper reach 51a of the conveyor belt 51 during movement in the direction of the arrow 63. A conveyor pan 64 is positioned between the rod 62c and the bottom of the upper reach 51a of the conveyor belt 51 in order to collect food particles or chips or the like. The bottom reach 51b of the conveyor belt 51 is supported by means of the rods 65 and 66 which are attached to the vertically extending legs 62a and 62b, respectively, and extend inwardly horizontally toward each other. Other upper conveyor belt support assemblies are designated as 67, 68, 69 and 70 and are identical to the support brace assembly 62 except for their relative positions within the tunnel T.

The articles are gradually frozen as they are moved along the conveyor belt 51 in the direction of arrow 63 from the entracne D to the exit E of the tunnel T by contact first with cryogenic vapors and then with a cryogenic liquid at super-cold cryogenic temperatures. The cryogenic liquid is sprayed through a header H which is mounted onto the bottom wall 10a of the top housing section and operates in a manner well known in the art to receive a super-cold cryogenic liquid and dispense the liquid through holes in the spray header H itself. As the sprayed cryogenic liquid contacts articles of food, which may be generally designated by the letter G, sufficient heat is transferred from the articles G to cause a portion of the sprayed cryogenic liquid to vaporize. In order to utilize the vaporized cryogenic liquid, which is still at an extremely cold temperature and is capable of absorbing heat from the articles G, circulating fans 71 and 72 and a suction blower 73 are mounted between the spray header 70 in the entrance D of the tunnel T in order to gradually pull the vapors from the vicinity of the spray header H toward the entrance D. In this manner the vapors may be utilized to gradually cool down the articles of food G as they are moved towards the spray header. The circulating fan 72 includes a fan motor 72a mounted onto the cross brace 13, which is further illustrated in FIG. 3, and drives a shaft 72b which extends down through an opening 10g in the top housing section 10. The shaft 72b, which is driven by the motor 72a, has mounted thereon a circulating fan blade 72c which draws the vapors from the spray header H toward the entrance D of the tunnel T. In a similar manner, the circulating fan 71 is mounted onto the cross brace 12 and extends through the top housing section 10 to draw the vapors from the area of the circulating fan 72 further towards the entrance D. The suction blower 73 is mounted onto a blower vent 74, which extends through the top housing section 10, and creates a vacuum in order to draw the vapors upward through the blower vent 74 to prevent the escape of any of the vapors so that such vapors may be collected, condensed and reused. Referring to FIG. 7, the bottom wall 10a of the top housing section 10 includes a recessed portion 74a which assists in directing the vapors upwardly through the blower vent 74. Another circulating fan 75 is mounted onto the H-shaped brace 14 and extends through the top housing section 10 between the spray header H and the exit E of the tunnel T.

A baffle assembly 76 is mounted onto the bottom wall 10a of the top housing section 10 just inside the entrance D of the tunnel T in order to prevent the escape of vapor out of the entrance D of the tunnel T. The baffle assembly 76 is comprised of a rod 76a, which is attached by any suitable means such as welding, to the bottom wall 10a of the top housing section 10 and has a double flap 76b of a flexible plastic material such as polytetrafluorethylene, sold under the trademark Teflon or a polyester sold under the trademark Mylar. The double flap 76b extends downwardly and actually engages the top reach 51a of the conveyor belt 51. A baffle assembly 77 is mounted onto the bottom wall 10a of the top housing section 10 between the spray header H and the circulating fan 75 and another baffle assembly 78 is mounted just inside the exit E of the tunnel T. The baffles 76 and 77 cooperate with the circulating fans 71 and 72 as well as the suction blower 73 to direct the vapors from the region of the spray header H toward the entrance D of the tunnel T against the direction of movement of the food articles G on the conveyor 51. Of course, among the advantages of directing the flow of the vapor countercurrently to the direction of movement of the food articles G is that heat transfer is increased.

As previously mentioned, seal means 35 are mounted onto the upper ends 31b and 32b of the U-shaped housing section 30 and are held in sealing engagement with the offsets 10b and 10c, respectively, when the hydraulic cylinder assemblies such as 40 hold the U-shaped housing section 30 in the normal or operating position.

Referring to FIG. 6, each of the seal means includes an elongated extruded member 35a which may be made of any resilient material such as silicone rubber. The extruded member 35a includes two raised portions or bulbs 35b and 35c. The extruded member 35a is mounted onto the upper ends such as 31b of housing section 30 by means of a metal strip 35d which is laid between the bulbs 35b and 35c. The metal strip 35d is held in position by means of a number of mounting studs 35e which extend through the metal strip 35d, the resilient member 35a and into the end portion 31b of the U-shaped housing portion 30. A film of Teflon, which is chemically identified as polytetrafluoroethylene, is wrapped about the resilient material 35a prior to its being mounted onto the top end 31b in order to protect the resilient characteristics of the extruded member 35a against the super-cold temperatures that will be experienced by the seal means 35.

A plurality of releasable clamp means generally designated as 80 are positioned strategically about the top housing section 10 and U-shaped bottom housing section 30 to clamp the housing sections in sealed engagement. Each of the clamp means 80 is releasable from locking the top housing section 10 and the U-shaped bottom housing section 30 in sealed engagement in cooperation with the seal means 35, so that the hydraulic cylinder assemblies 40, 41, 42 and 43 can be activated to move the U-shaped housing section 30 downwardly to the position 50 for ease in cleaning. Referring to FIG. 5 in particular, each of the releasable clamp means designated as 80 includes a latch guide 80a which is mounted onto an outside wall such as outside wall 31d of the side portion 31a. A toggle arm 80b is pivotally attached to a stud attached to a stud 80c extending laterally from the latch guide 80a. A hook 80d is pivotally attached to the toggle arm 80b by means of a pin 80e and, a catch 80f having a flat surface 80g is attached to the top housing section 10. With the releasable clamp means in the position illustrated in FIG. 5, the upper curved portion of the hook 80d is positioned against the flat surface 80g of the catch 80f and the toggle arm 80b has been moved downwardly to a substantially vertical position such that the hook 80d presses against the catch 80f thereby holding the top housing section 10 down against the seal means 35 mounted on end 31b of housing section 30. In order to release the releasable clamp means 80, the toggle arm 80b is moved outwardly from the outside wall so that the hook 80d is moved upwardly and away from the flat surface 80g of the catch 80f. By releasing all of the releasable clamp means 80, the U-shaped housing portion 30 is freed for movement downwardly to the exposed position designated by the number 50 in FIGS. 1 and 4.

OPERATION

In operation and use of the cryogenic freezing unit A of the preferred embodiment of this invention, the U-shaped bottom housing section 30 is in the normal or operating position with the seal means held in sealed engagement with the offsets 10b and 10c in the bottom wall 10a of the top housing section 10 by the locking of the releasable clamps 80. The spray header H is adapted to receive and spray a cryogenic liquid such as carbon dioxide or nitrogen in liquid form through apertures therein in the direction of arrows 90 toward the upper reach 51a of the conveyor belt 51, which is moving in the direction of arrow 63 by means of the motor 61. Food articles G are placed onto the upper reach 51a of the conveyor belt 51 just outside of the entrance D to the tunnel T of the cryogenic freezing unit A and move in the direction of arrow 63.

As the cryogenic liquid is sprayed downwardly onto the upper reach 51a of the conveyor belt 51, some of the cryogenic liquid contacts the article G, which has already been partially cooled in a manner to be described hereinafter, and the liquid absorbs such heat from the article G that the liquid is vaporized. With respect to the vapor produced as a result of the heat transfer from the article G to the sprayed liquid, the vapor is moved countercurrently to the movement of the articles G on the conveyor belt 51 toward the entrance D. Such countercurrent movement by the vapor is caused by the circulating fans 72 and 71 and the suction blower 73 which cooperate to draw the vapor along the upper reach 51a of the conveyor belt and finally into the blower vent 74. As the vapor is moved along the conveyor belt between the sprayer head H and the blower vent 74, the vapor increases in temperature due to contact with the articles G. In this manner incoming articles G are exposed to colder temperatures of vapor as the articles are moved toward the sprayer head H. The baffles 76 and 77 cooperate to assist in the forming of a gradual cooling zone in which the articles are first gradually cooled and then super-cooled or frozen upon direct contact with the sprayed cryogenic liquid in the vicinity of the spray header H.

As a way of explanation and not by limitation, the theory behind such cryogenic cooling appears to be that, upon the articles coming in direct contact with the sprayed cryogenic liquid from the spray header H, the articles are super-cooled or "over-frozen" on the outside and are not yet completely frozen on the inside. In order to allow time for the frozen condition within the article to equalize, the articles are passed through what may be termed an equilibrium zone between the baffle assemblies 77 and 78 where the circulating fan 75 is rotating. The speed of the conveyor belt 51 allows sufficient time for the temperature throughout the entire article G traveling thereon to substantially equalize. In this manner, the article G is completely frozen at a substantially uniform temperature prior to leaving the exit E on the conveyor belt 51. Of course, it is understood that this explanation may not be true if the articles are extremely thin or perhaps even extremely thick and that this explanation is not intended in any way to limit the applicability, use or scope of the invention claimed herein.

In utilizing a cryogenic liquid to freeze the articles G, the maximum heat transfer from the articles takes place when the articles contact the cryogenic liquid rather than the vapor. One explanation for the more effective heat transfer between the articles G and the cryogenic liquid is simply that the cryogenic liquid is at a super-cold temperature, for instance, minus 375° F., whereas the vapor is at a higher temperature. Therefore, it is extremely important to the efficiency of a cryogenic freezing unit such as A to completely utilize the sprayed cryogenic liquid by designing the unit so that substantially all of the cryogenic liquid contacts the articles G as they move through the tunnel T on the conveyor belt 51. In the past, any of the sprayed liquid that remained after the sprayed liquid passed through the upper reach 51a of the mesh conveyor belt 51, was left to drain slowly towards the entrance D of the tunnel T on a flat conveyor pan. This method of using the remaining cryogenic liquid has been found undesirable since the liquid never again contacts the articles G and thus the heat or vaporization of this remaining cryogenic liquid is not taken directly from the articles of food G as they pass along the conveyor belt 51. Rather, such unused cryogenic liquid is simply eventually vaporized as the temperature within the tunnel increases as the liquid is moved forward along the flat conveyor pan similar to the conveyor pan 64 of this invention.

In one aspect of this invention, it has been found that the positioning of a recess or cavity 91 in the conveyor pan 64 immediately below the spray header H provides for an accumulation or collection of any cryogenic liquid which is not vaporized at the initial spraying of the liquid from the spray header H. Such cryogenic liquid collects or accumulates on the substantially horizontal bottom 91a of the recess 91 and forms into a pool of liquid 92. Since the conveyor belt 51 is made of a flexible material, the upper reach 51a of the moving conveyor belt 51 tends to sag over the recess 91 and into the recess 91 and the pool of liquid 92 accumulated therein. In this manner, the articles of food G placed on the upper reach 51a of the conveyor belt tend to move through the pool of liquid 92 with the sagging conveyor belt at the recess 91 and thereby come directly in contact with the accumulated pool of liquid 92. Therefore, the pool of liquid 92 represents cryogenic liquid which previously never contacted the food articles G after being sprayed from the spray header H. By utilizing the recess 91 in the conveyor pan 64 in this invention, the previously unused cryogenic liquid now does come in contact with or at least in very close proximity to the food articles G and thus the liquid on the pool 92 obtains its heat or vaporization directly from the food articles G thereby rendering freezing operation much more efficient. Further, the food articles G are exposed to cryogenic liquid not only from above but also from below so that the freezing temperatures that the articles are exposed to are even and substantially uniform.

Of course, any such freezing operation for food must be extremely sanitary. In fact, there are federal regulations issued by either the United States Department of Agriculture or the United States Department of the Interior which require that such cryogenic freezing units A be periodically cleaned in order to maintain the units in a most sanitary condition. For example, Federal regulations may require that the cryogenic freezing unit be cleaned once a week or perhaps even once every four hours. Heretofore, it has been rather difficult to clean such cryogenic freezing units as it has been difficult to expose the various elements constituting the cryogenic freezing unit for ease in cleaning. However, by utlizing the plurality of hydraulic cylinder assemblies 40, 41, 42 and 43 of this invention, after the releasable clamp means 80 have been released, the U-shaped bottom housing section 30 may be lowered to the position represented by the number 50 thereby exposing the suspended conveyor belt 51, the conveyor pan 64 and the inside walls 31a, 33a and 32a of the bottom U-shaped housing section 30 for cleaning purposes. The cleaning may be accomplished by utilizing hot water or steam or other desirable means.

After the cryogenic freezing unit A has been cleaned the bottom U-shaped housing section is moved upwardly and the releasable clamp means 80 are locked such that the seal means 35 are in sealed engagement with the offsets 10b and 10c of the first housing section 10 so that the motor 51 and the other elements may be activated again. The continual shutting on and off of the cryogenic freezing unit A subjects the entire unit to temperature fluctuation between cryogenic temperatures during use and room temperatures when being cleaned. This exposure of the unit A to temperatures from the super-cold range to ambient temperatures puts additional stress on the side portions 31 and 32 and the bottom portion 33 of the U-shaped housing as well as on the top housing section 10. Such stresses may cause the side portions 31 and 32 to buckle or otherwise distort either completely or in certain areas along the length of the unit. The locking of a seal such as seal means 35 by the releasable clamp means 80 provides effective seals throughout the length of the tunnel T in spite of distortion or buckling.

The utilization of double bulb seals 35 provide an even more effective seal throughout the length of the tunnel T. Referring to FIG. 6, since one bulb 35c is positioned near outside wall 31d and the other bulb 35b is positioned near inside wall 31a of the U-shaped housing 30, if the side portion such as 31 of the U-shaped bottom housing section 30 were to distort, it is much more likely that one of the bulbs, either 35b or 35c, would continue to engage the offset 10b such that the seal between the tunnel T and the outside environment would remain effective in spite of such buckling or distortion of the walls.

The foregoing disclosure and description of the invention are illustrative and explanatory thereof, and various changes in the size, shape and materials as well as in the details of the illustrated construction may be made without departing from the spirit of the invention. For example, the cryogenic freezing unit A of this invention may be utilized not only to freeze articles of food G or the like; but also, it may be utilized to partially freeze such articles, as desirable. It is further contemplated that other materials than stainless steel may be utilized to constitute the walls of the housing sections 10 and 30 if such materials may withstand the cryogenic temperatures. Other insulation materials than polyurethanes may be utilized if they are also found suitable. It is further understood that the number of circulating fans, which in the preferred embodiment of this invention are three plus a suction blower, may be varied depending upon the length of the tunnel, the type of article being frozen or other factors.

I claim:

1. Apparatus for cryogenically freezing articles, comprising:
   a. a housing including an upper housing section mounted in sealed engagement with a lower housing section to form a tunnel, said upper housing section being supported on a plurality of legs, and said lower housing section being substantially U-shaped;
   b. conveyor means for conveying articles through said tunnel;
   c. suspension means suspending said conveyor means from said upper housing section;
   d. freeze means mounted with said upper housing section in said tunnel for cyrogenically freezing said articles as said conveying means conveys said articles through said tunnel; and e. expose means mounted with said upper and lower housing sections for moving said lower housing section downwardly a limited but sufficient distance away from said upper housing section and said conveyor means mounted thereon to an exposed position apart from said upper housing section whereby said conveyor means, freeze means and said upper and lower housing sections are exposed for cleaning or other maintenance operations.

2. The structure set forth in claim 1 in which said expose means includes:
   a. a hydraulic cylinder mounted on said upper housing section; and
   b. a piston and rod combination slidably, sealably mounted in said hydraulic cylinder, said rod being attached to said lower housing section whereby hydraulic fluid under pressure in said cylinder moves said lower housing section away from engagement with said upper housing section.

3. The structure set forth in claim 1, including:
   a. said lower housing section including opposing side portions and a connecting portion connected to said opposing side portions, said side portions being positioned with respect to said upper housing section to form said tunnel; and
   b. seal means mounted on said opposing side portions and sealably engaging said upper housing section to seal said tunnel throughout the length thereof.

4. The structure set forth in claim 1, including:
   releasable clamp means attached to said upper and lower housing sections for locking said lower housing section in sealing engagement with said upper housing section.

5. The structure set forth in claim 4, in which said freeze means includes:
   a. a spray header mounted with said upper section for spraying a cryogenic fluid toward articles on said conveyor;
   b. said conveyor means conveying said articles in one direction through said tunnel; and
   c. circulating means mounted on said upper housing section for circulating said sprayed cryogenic fluid in said tunnel in a direction opposite to the movement of said articles whereby said articles are gradually frozen during movement through said tunnel.

6. The structure set forth in claim 4 in which said upper and lower housing sections include:
   inside and outside walls of stainless steel having an insulating material disposed therebetween.

7. The structure set forth in claim 1 including:
   a. seal means disposed between said upper and lower housing sections;
   b. said seal means including a resilient member which extends between said first and second housing sections and a Teflon film covering said resilient member whereby said sealing means substantially resists embrittlement due to exposure to cryogenic conditions.

8. The structure set forth in claim 1, including:
   a. said freeze means includes spray means for spraying a cryogenic liquid toward said conveyor means;
   b. said conveyor means includes accumulator means for accumulating sprayed cryogenic liquid whereby said articles are further exposed to said cryogenic liquid.

9. The structure set forth in claim 8, including:
   a. said conveyor means includes a conveyor belt defined by upper and lower reaches; and
   b. said accumulator means includes a pan disposed between said upper and lower reaches and having a recess therein for receiving said sprayed cryogenic liquid whereby sprayed cryogenic liquid which has not evaporated accumulates in said recess.

10. The structure set forth in claim 8, including:
    said conveyor belt is flexible such that said conveyor belt sags at least partially into said recess whereby articles on said conveyor belt contact said accumulated cryogenic liquid.

11. The structure set forth in claim 1, including:
    seal means disposed between said upper and lower housing sections, said seal means including adjacently positioned elongated seal bulb members extending the length of said housing.

12. The structure set forth in claim 11, including:
    said bulb members being wrapped in a film of Teflon.

* * * * *